June 24, 1930.  J. HOLAN  1,767,071
CURTAIN FOR MOTOR VEHICLES
Filed Sept. 10, 1927
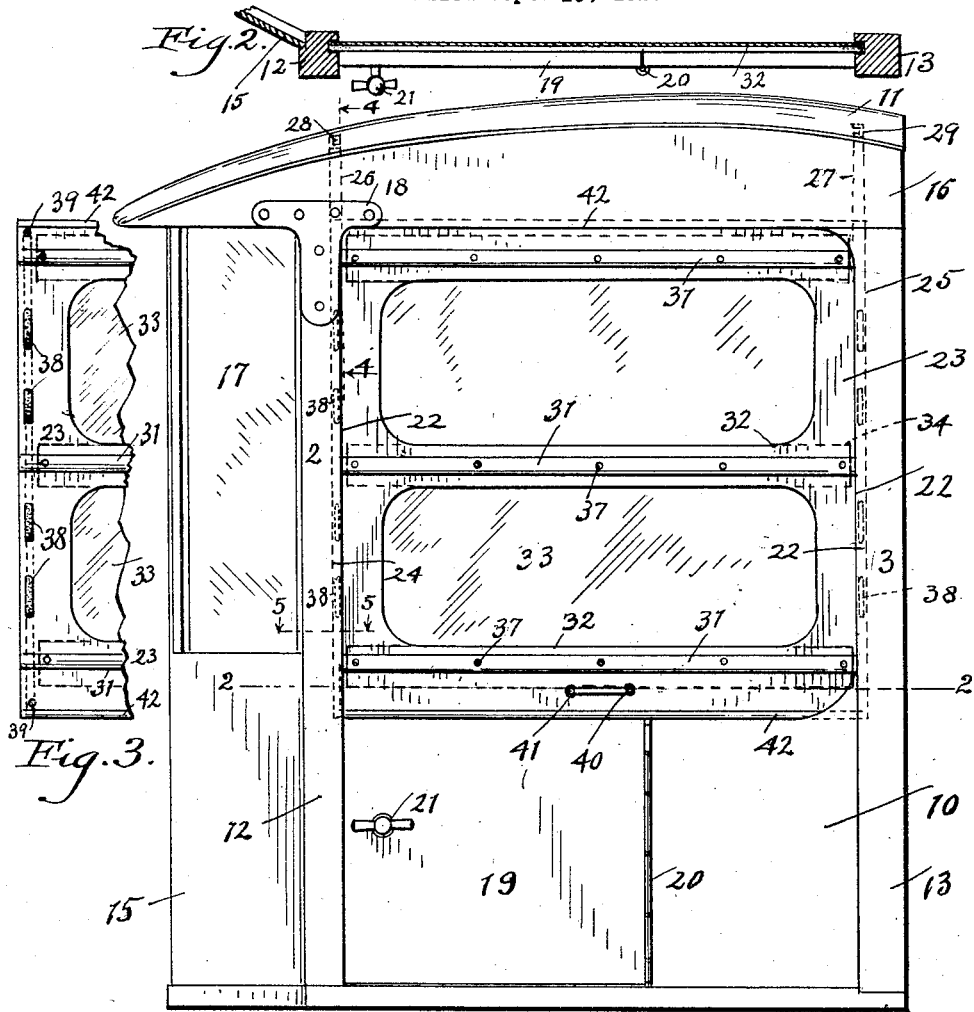
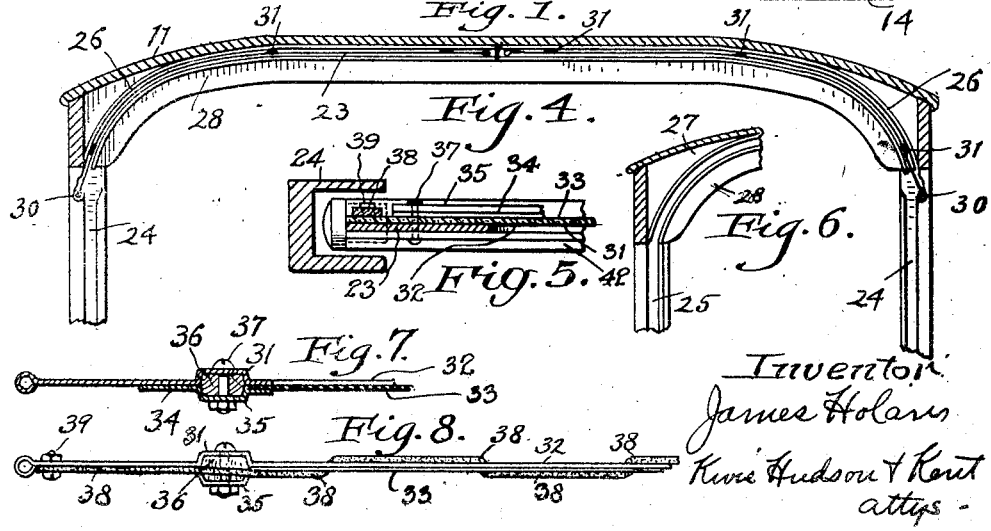

Patented June 24, 1930

1,767,071

UNITED STATES PATENT OFFICE

JAMES HOLAN, OF CLEVELAND, OHIO, ASSIGNOR TO THE AMERICAN COACH & BODY COMPANY, OF CLEVELAND, OHIO, A CORPORATION OF OHIO

CURTAIN FOR MOTOR VEHICLES

Application filed September 10, 1927. Serial No. 218,768.

This invention relates to closure members for the cabs of motor vehicles, and has as its primary object to provide a flexible closure member which can be raised or lowered at will, the closure member sliding in suitable grooves provided in the cab and adapted to be disposed beneath the roof of the cab when in raised position.

A further object of the invention is to provide means for maintaining the closure member in raised position, which closure member must be manually disengaged from the said means in order to lower the closure member into closed position.

A further object of the invention is to provide a closure member of a thin sheet of flexible metal, which, because of its flexibility, will conveniently bend without injury in traveling from a vertical closed position to a substantially horizontal open position.

A further object of the invention is to provide reinforcing means for the metallic closure member, which are so disposed that they do not interfere with the horizontal flexibility of the closure member.

A further object of the invention is to provide transparent coverings for the transverse openings in the flexible metal closure member and means detachably connected to the closure member for maintaining the transparent material in proper position over the openings.

With the objects above indicated and other objects hereinafter explained in view, my invention consists in the construction and combination of elements hereinafter described and claimed.

Referring to the drawings,

Figure 1 is a side elevational view of a cab for a motor vehicle, showing the closure member in closed position.

Figure 2 is a transverse sectional view taken on the line 2—2 of Figure 1 and showing the guides for the closure member.

Figure 3 is a fragmentary view of the end of the closure member.

Figure 4 is a fragmentary vertical sectional view taken on the line 4—4 of Figure 1, showing the means for maintaining the closure member in raised or elevated position.

Figure 5 is a fragmentary sectional view taken on the line 5—5 of Figure 1, and showing the guide for the end of the closure member.

Figure 6 is a fragmentary sectional view showing the guide at the rear portion of the cab.

Figure 7 is a fragmentary sectional view of the closure member showing the reinforcing means and the detachable means for the transparent material of the openings.

Figure 8 is an end view of a portion of the closure member, showing the lacing at the outer edges of the closure member.

In the drawings the cab is indicated by the numeral 10 generally, and consists of a top 11 supported by vertically extending front uprights 12 and rear uprights 13, which can be secured to the top 11 in any suitable and customary manner. A floor 14 is connected to the lower ends of the uprights 12 and 13 in any suitable manner, and extending around the forward portion of the cab 10 is a sheet metal enclosure 15 secured to the oppositely disposed front uprights 12 and to a frame 16 at the top portion of the cab 10 and the bottom or floor 14. The metal enclosure 15 is provided with glass windows 17, as clearly shown in Figure 1, so that the driver is enabled to see through the cab without interference. To reinforce the frame member 16, T-shaped brackets 18 are bolted or otherwise secured to the frame member 16 and the front upright members 12. A door 19 is pivotally connected at 20 and is provided with an operating handle 21 at the forward end of the door, so that the latter may be freely opened and closed. The construction so far described is the customary construction of cabs for trucks and the like, and inasmuch as it forms no part of the present invention it is not believed necessary to more specifically describe the structure than has heretofore been done.

An opening 22 is provided upon opposite sides of the cab 10 between the door 19 and the frame member 16. In case of rain or other disagreeable atmospheric conditions it is necessary for the driver of the cab to close the opening usually by the customary fabric curtain held in place by suitable snaps. This arrangement is very disadvantageous, inasmuch as it requires the driver to unhook or unsnap the curtain each time he desires to leave the cab. When he again returns to the inside of the cab it is necessary that he snap the curtains back in place, and in view of having to continually remove and replace a portion of the curtain in order to leave and enter the cab he very often drives along without any closure member up at the openings 22 at all. Furthermore, the detachable curtains are likely to become lost, or misplaced, or have to be kept in some remote place from the openings 22, and it is, therefore, much easier to drive around without the curtains in position than to take the time to locate the curtains and snap them in place over the openings 22.

It is my intention to overcome this disadvantage by providing a slidable curtain suitably guided in guides extending along opposite sides of the uprights, and which curtain is of such a flexible nature that it will readily bend, so that the curtain can be moved back adjacent the top of the cab out of the way when not employed, and yet be within the operator's reach when it is desired to close the opening.

The slidable curtains 23 for closing the openings 22 on the opposite sides of the cab are preferably composed of a flat sheet of resilient rust proof metal, such as aluminum alloy or the like, and is of a width sufficient to extend within vertically extending grooves 24 upon the inner faces of the uprights 12 and vertically extending grooves 25 upon the inner faces of the rear uprights 13. These vertical grooves 24 and 25 can extend along the entire inner faces of the uprights 12 and 13, but in any event should extend below the upper edge of the door 19. The upper ends of the grooves 24 and 25 coincide with channel members 26 and 27, respectively, which have their outer ends curved downwardly adjacent the upper ends of the grooves 24 and 25, while the inner ends extend substantially horizontal, as clearly shown in Figure 4. These channel members 26 and 27 are secured by bolts, or other suitable means, to transversely extending struts 28 and 29, respectively, which not only support the channel members 26 and 27, but further act as reinforcing means for the top 11 of the cab 10. The flanges of the channel members 26 and 27 extend inwardly, and the grooves between the flanges of the channel members are positioned to align with the vertically extending grooves or guides 24 and 25 in the uprights 12 and 13, so as to provide a continuous guide for the slidable closure member 23. It will, therefore, be noted that when the closure member 23 is raised from the closed position shown in Figure 1, the closure member is directed by the curved ends of the channel members 26 and 27 around to substantially a horizontal position adjacent the top 11.

To prevent the closure member 23 from accidentally dropping down over the opening 22 in the cab, I provide notches 30 in the outer portions of the uprights 12 and offset with respect to the vertical grooves or guides 24, as clearly shown in Figure 4. The resiliency of the metal closure 23, therefore, causes the lower end of the closure 23 to be forced outwardly and the end consequently rests in the notches 30. The closure member 23 is, therefore, securely maintained in raised position, as indicated in Figure 4, and to lower the curtain it is only necessary for the operator to slightly raise the end of the curtain and draw inwardly upon a suitable handle secured to the lower inner end of the curtain and thence downwardly, at which time the lower end of the curtain has been moved into the vertically extending grooves or guides 24.

In Figure 6 I have shown the guides in the rear uprights 13, but have not included this notch 30, inasmuch as it is not required at the rear end of the curtain, but it should be understood that such a notch can be provided if desirable.

The closure member 23 can be readily removed from the uprights 12 and 13 by providing a suitable transverse slot leading from the grooves or guides 24 and 25 in the uprights 12 and 13 to the inner surface of the uprights, so that when the curtain is lowered the lower end can be guided outwardly beyond the guides 24 and 25. It should be here stated that the closure 23 is adapted to rest upon the upper edge of the door 19, which thereby properly positions the closure member with respect to the openings 22 in the sides of the cab 10.

The closure member 23 is provided with horizontally extending expanded portions 31, three of which are here illustrated, for the purpose of reinforcing the flexible closure member 23 against vertical bending, but at the same time not interfering with its flexibility in a horizontal plane.

Between the expanded portions 31 are transverse openings 32 which are covered with some flexible transparent material 33, such as celluloid, which is securely maintained over the openings 32 by longitudinally extending clips 34 clearly shown in Figure 7. This transparent material extends substantially to the edges of the closure member. These clips are provided with expanded portions 35 which extend oppositely to the expanded portions 31 when in assembled position with the closure member 23 but coextensive therewith, and within the opening formed by these expanded portions 31 and 35 is preferably a wooden filler block 36. The clips 34 are detachably connected to the closure member 23 by a plurality of bolts 37 extending through the expanded portions 31 and 35 and through the filler block 36.

To provide a suitable wearing edge for the closure member 23, the outer ends of the closure member are provided with suitably spaced openings adapted to receive therein a lacing 38 of any suitable material, which also extends through suitable openings along the edges of the transparent material 33 to maintain the transparent material and the closure member in assembled relation and which also retains the edges of the transparent material 33 in place and which lacing can be detachably connected by a bolt 39, or any other suitable means, at the upper and lower portions of the closure member 23.

A pair of handles 40 are connected by rivets 41, or any other suitable means, to the bottom edge of the closure member 23 and upon opposite sides thereof, so that the curtain may be raised from either the inside or the outside of the cab 10.

The upper and lower edges of the closure member 23 are looped over, as at 42, to provide a finished edge for the curtain, and at the same time to provide means for receiving the headed pins 43 which are adapted to engage with the grooves 24 and 25 in the uprights 12 and 13, and thereby prevent unnecessary wearing action upon the material around the grooves.

While I have described the preferred construction embodying the present invention, it is to be understood that I am not to be limited to this precise structure, inasmuch as changes may be made thereto without departing from the spirit of the invention and defined in the appended claims.

Having thus described my invention what I claim as new and desire to secure by Letters Patent is,

1. A closure of the type described, comprising a sheet of flexible metal, transverse openings therein, transparent material covering said openings, detachable means extending transversely of said sheet for maintaining said material over said openings and permitting substantially uniform flexibility therebetween, and lacing extending through said sheet and transparent material for maintaining the latter in proper position.

2. In a closure of the type described comprising a thin sheet of flexible metal, expanded portions extending transversely thereof to thereby permit substantially uniform flexibility therebetween, openings between said expanded portions, transparent material covering said openings, detachable members provided with expanded portions coextensive with the expanded portions of said metal sheet and attached to said metal sheet, and filler members disposed between said expanded portions.

3. In a closure of the type described comprising a thin sheet of flexible metal, expanded portions extending transversely thereof, openings between said expanded portions, transparent material covering said openings, detachable members provided with expanded portions coextensive with the expanded portions of said metal sheet and attached to said metal sheet, filler members disposed between said expanded portions, and lacings extending through said sheet and transparent material for maintaining the latter in position.

4. In a closure of the type described comprising a thin sheet of flexible metal having transversely extending looped portions at the top and bottom thereof, expanded portions extending transversely thereof, openings between said expanded portions, transparent material covering said openings, detachable members provided with expanded portions coextensive with the expanded portions of said metal sheet and attached to said metal sheet to thereby permit substantially uniform flexibility therebetween, filler members disposed between said expanded portions, and a handle secured to said metal sheet.

5. In combination with an enclosure provided with an opening, of guides extending substantially vertically along opposite sides of the opening and substantially horizontally along the top of the enclosure, and a flexible sheet metal closure member adapted to slide in said guides to close said opening, said member being provided with an opening or openings, transparent material covering said openings, members extending transversely of said closure member adjacent said opening or openings in such a manner as to permit substantially uniformal flexibility therebetween, and lacings extending through said closure member and transparent material and along the edges of said member to thereby maintain the material in position, said lacings being further adapted to engage said guides to prevent injury to said material.

6. In combination, the cab of a motor vehicle provided with openings upon opposite sides of the cab, guides extending along the opening, guides extending transversely along the top of the cab and communicating with the first mentioned guides, a flexible metal closure member disposed within said guides and adapted to close said opening, and means adjacent the upper portion of the first mentioned guides adapted for engagement with said closure member to retain the latter in open position.

In testimony whereof, I hereunto affix my signature.

JAMES HOLAN.